(12) United States Patent
Wayment et al.

(10) Patent No.: US 11,718,267 B1
(45) Date of Patent: Aug. 8, 2023

(54) INITIATOR FOR A GAS GENERATOR OF A VEHICLE SAFETY DEVICE

(71) Applicant: Autoliv ASP, Inc., Ogden, UT (US)

(72) Inventors: Mason Wayment, Roy, UT (US); Matthew Erni, Clinton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/697,985

(22) Filed: Mar. 18, 2022

(51) Int. Cl.
    *B60R 21/264* (2006.01)
    *B60R 21/26* (2011.01)

(52) U.S. Cl.
    CPC .. *B60R 21/264* (2013.01); *B60R 2021/26052* (2013.01)

(58) Field of Classification Search
    CPC .......................... B60R 21/264; B60R 21/2644
    See application file for complete search history.

(56) References Cited

U.S. PATENT DOCUMENTS

| | | | | |
|---|---|---|---|---|
| 5,456,492 A * | 10/1995 | Smith | ...................... | B60R 21/26 137/68.13 |
| 5,713,597 A | 2/1998 | Bailey | | |
| 6,116,642 A * | 9/2000 | Shirk | ................... | B60R 21/2644 280/736 |
| 6,709,011 B2 * | 3/2004 | Neunzert | ............ | B60R 21/2644 280/736 |
| 6,722,694 B1 * | 4/2004 | Nakashima | ......... | B60R 21/2644 280/736 |
| 7,004,778 B2 * | 2/2006 | Barker | ................. | H01R 13/627 439/352 |
| 7,267,056 B2 * | 9/2007 | Takahara | ................ | F42B 3/103 280/741 |
| 7,316,187 B2 * | 1/2008 | Hansen | ................... | F42B 3/127 280/741 |
| 7,322,292 B2 * | 1/2008 | Nishimura | .............. | F42B 3/121 361/251 |
| 2002/0069782 A1 | 6/2002 | Avetisian et al. | | |
| 2002/0145275 A1 | 10/2002 | Hosey et al. | | |

(Continued)

FOREIGN PATENT DOCUMENTS

| | | | | |
|---|---|---|---|---|
| EP | 0779187 A2 * | 6/1997 | | |
| EP | 1434025 A1 * | 6/2004 | ............. | F42B 3/124 |

(Continued)

OTHER PUBLICATIONS

International Search Report and Written Opinion issued in PCT/US2023/015146, dated Jun. 13, 2023: ISA/WO.

*Primary Examiner* — Nicole T Verley
(74) *Attorney, Agent, or Firm* — Harness, Dickey & Pierce, P.L.C.; Stephen T. Olson

(57) ABSTRACT

An initiator for a gas generator of a vehicle safety device includes a cup defining an interior, a primary pyrotechnic material disposed in a primary combustion chamber in the interior of the cup, and a pair of electrical pins in reaction initiating communication with the primary pyrotechnic material through a bridge wire. The bridge wire is in reaction initiating contact with the primary pyrotechnic material at a first end of the primary pyrotechnic material. The primary pyrotechnic material is compacted within the primary combustion chamber to include a depression at a second end of the primary pyrotechnic material, the second end opposite the first end.

17 Claims, 4 Drawing Sheets

(56) References Cited

U.S. PATENT DOCUMENTS

| | | | | |
|---|---|---|---|---|
| 2002/0174791 | A1* | 11/2002 | Avetisian | F42B 3/125 |
| | | | | 102/202.7 |
| 2004/0000247 | A1* | 1/2004 | Rosu | F42B 3/195 |
| | | | | 102/202.5 |
| 2005/0115434 | A1* | 6/2005 | Avetisian | F42B 3/195 |
| | | | | 102/202.7 |

FOREIGN PATENT DOCUMENTS

| | | | | |
|---|---|---|---|---|
| EP | 1591747 A2 * | 11/2005 | | F42B 3/125 |
| WO | 9931456 | 6/1999 | | |
| WO | WO-0162554 A1 * | 8/2001 | | B60R 21/26 |
| WO | WO-0246688 A1 * | 6/2002 | | F42B 3/125 |
| WO | WO-2004003457 A1 * | 1/2004 | | F42B 3/125 |
| WO | WO-2004003458 A1 * | 1/2004 | | F42B 3/125 |
| WO | WO-2004003459 A1 * | 1/2004 | | F42B 3/195 |

\* cited by examiner

INITIATOR FOR A GAS GENERATOR OF A VEHICLE SAFETY DEVICE

FIELD

The present disclosure generally concerns initiators for gas generators of vehicle safety devices such as inflatable airbags and pretensioned seatbelts. More particularly, the present disclosure relates to an initiator for a gas generator having a primary pyrotechnic material compacted to include a central depression.

BACKGROUND

This section provides background information related to the present disclosure which is not necessarily prior art.

Inflatable occupant restraint systems, including airbags, are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components. Side airbags may also be carried by a vehicle seat.

Inflator devices are employed to produce or supply inflation gas for inflating an inflatable airbag in the event of a collision. The inflator devices for such applications often include a gas generant material stored within the housing of the inflator device. The gas generant material is actuated by an initiator when a sensor of the vehicle senses an accident condition (e.g., measures abnormal deceleration). Actuation of the gas generant material triggers inflation of the airbag within a few milliseconds with the produced gas. The inflated airbag cushions the vehicle occupant from impact forces. Initiators are also used for the pretensioning of seatbelts.

Initiators may commonly have a first or primary pyrotechnic material and a second or secondary pyrotechnic material. The primary pyrotechnic material is actuated by an electrical signal and in turn ignites the secondary pyrotechnic material. Heat from combustion of the secondary pyrotechnic material ignites gas generant material of the inflator device to produce inflation gases for an airbag.

While known initiators for occupant restraints have generally proven to be suitable for their intended uses, a continuous need for improvement in the relevant art remains.

SUMMARY

This section provides a general summary of the disclosure and is not a comprehensive disclosure of its full scope or all of its features.

It is a general object of the present teachings to provide an initiator for a gas generator of a vehicle safety device that has a compacted primary pyrotechnic material with a more predictable density profile.

In accordance with one particular aspect, the present teachings provide an initiator for a gas generator of a vehicle safety device which includes a cup defining an interior, a primary pyrotechnic material disposed in a primary combustion chamber in the interior of the cup, and a pair of electrical pins in reaction initiating communication with the primary pyrotechnic material through a bridge wire. The bridge wire is in reaction initiating contact with the primary pyrotechnic material at a first end of the primary pyrotechnic material. The primary pyrotechnic material is compacted within the primary combustion chamber to include a depression at a second end of the primary pyrotechnic material, the second end opposite the first end.

In accordance with another particular aspect, the present teachings provide an initiator for a gas generator of a vehicle safety device including a cup defining an interior, a primary combustion chamber within the interior of the cup, a primary pyrotechnic material disposed in a primary combustion chamber, and a pair of electrical pins in reaction initiating communication with the primary pyrotechnic material through a bridge wire. The bridge wire is in reaction initiating contact with the primary pyrotechnic material at a first axial end of the primary pyrotechnic material. The primary pyrotechnic material is axially compacted within the primary combustion chamber to include a first density at a radially inner portion of the primary pyrotechnic material and a second density at a radially outer portion of the primary pyrotechnic material. The first density is at least as great as the second density.

In accordance with yet another particular aspect, the present teachings provide initiator for a gas generator of a vehicle safety device including a cup defining an interior, a primary combustion chamber including a primary pyrotechnic material, a secondary combustion chamber including a secondary pyrotechnic material, and a pair of electrical pins in reaction initiating communication with the primary pyrotechnic material through a bridge wire. The bridge wire is in reaction initiating contact with the primary pyrotechnic material at a first axial end of the primary pyrotechnic material. The primary pyrotechnic material is compacted within the primary combustion chamber to include a depression at a second axial end of the primary pyrotechnic material opposite the first axial end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
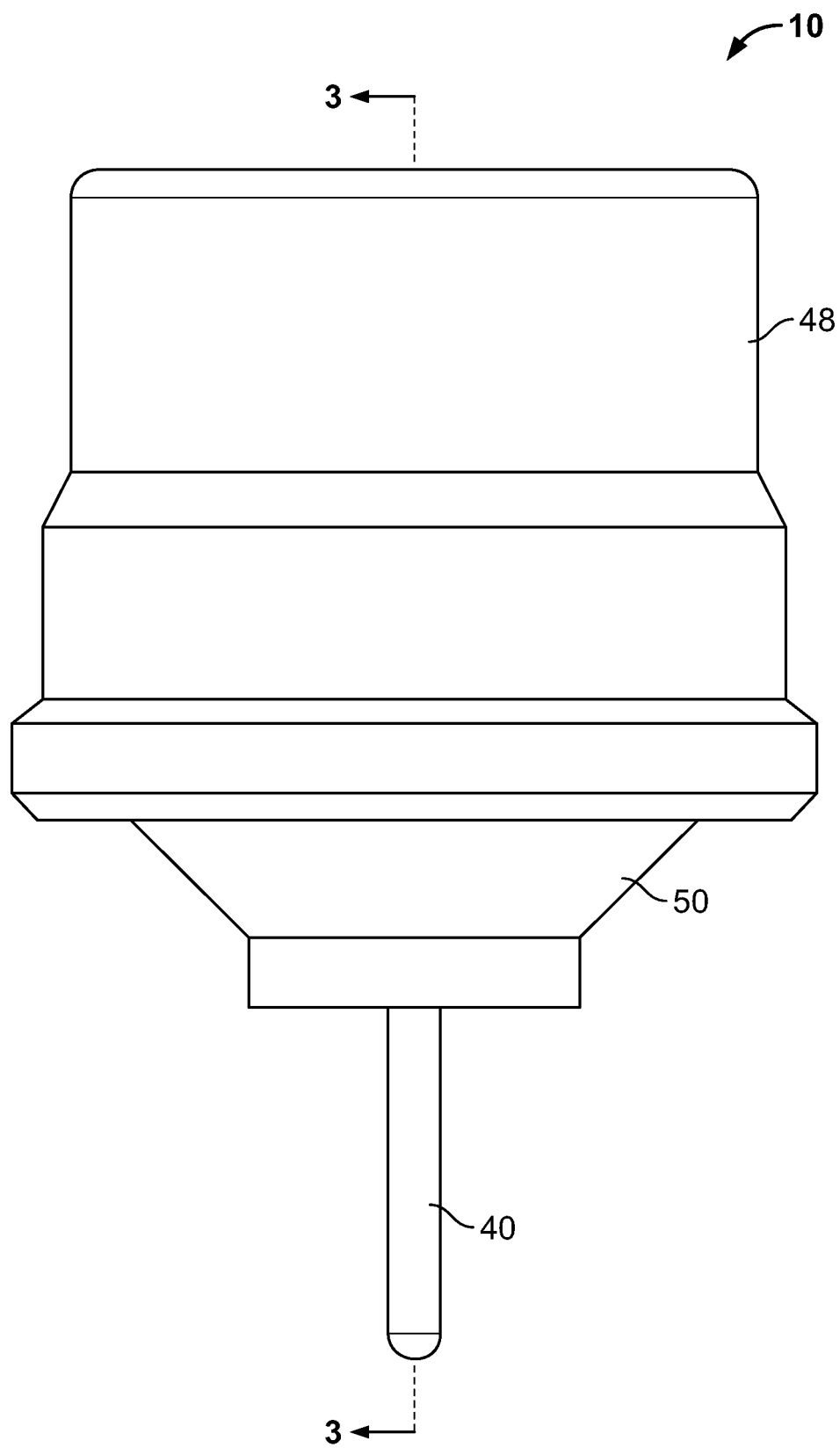
FIG. 1 is a side view of an initiator for a gas generator of a vehicle occupant restraint in accordance with the present teachings.
Figure 2:
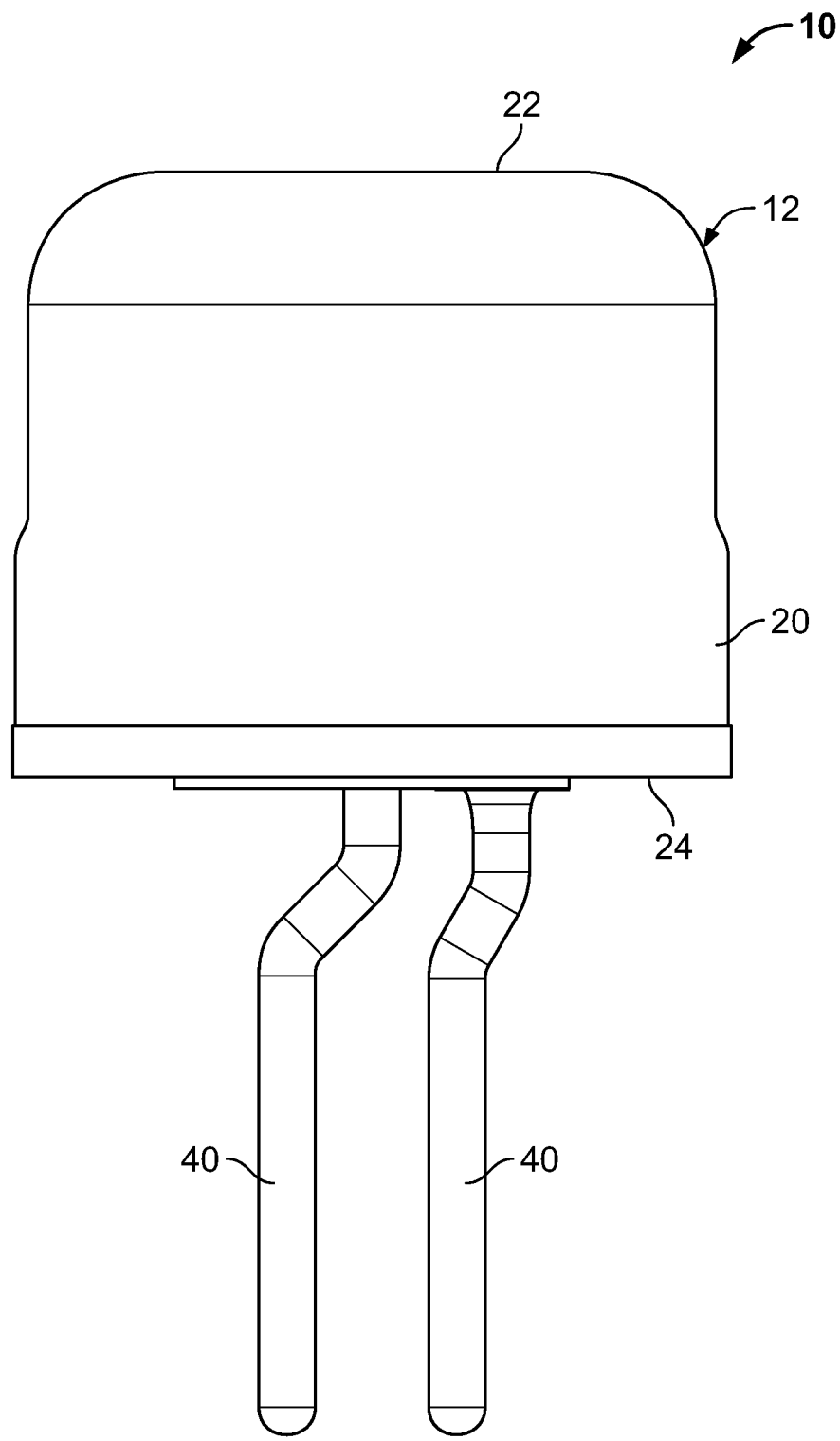
FIG. 2 is another side of the initiator for a gas generator in accordance with the present teachings, the initiator shown rotated 90 degrees about its axis and an insulated resistance cover of the initiator shown removed for purposes of illustration.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With reference to drawings, an initiator for a gas generator of a vehicle safety device in accordance with the present teachings is illustrated and generally identified at reference character 10. The initiator 10 may be part of an occupant restraint system of a motor vehicle that includes a gas generator and an inflatable airbag (not particularly shown), for example. The exemplary inflator or pyrotechnical inflator 10 shown in the drawings is particularly adapted for a driver side front airbag of an occupant restraint system. It will be understood, however, that the initiator 10 described herein may be readily adapted for use with other airbags or with seatbelt pretensioners.

The initiator 10 is generally illustrated to include a cup or case 12, a first or primary pyrotechnic material 14, and a second or secondary pyrotechnic material 16. The primary and secondary pyrotechnic materials 14, 16 are disposed or stored in an interior 18 of the cup 12. The cup 12 may include a cylindrical sidewall 20 and a circular base. The cylindrical sidewall 20 that extends along an axis A of the initiator 10 between a closed end 22 and an open end 24. The cup 12 may be formed of metal and may be formed by cold striking. In one particular example, the cup 12 may be formed by stamping a sheet of nickeled steel, such as DC04 or DC06 and may have a thickness between 0.3 and 0.6 mm.

While not illustrated, it will be understood that the cup 12 may be preferably formed to include a plurality of weakened zones that open in response to a pressure from within the cup 12 generated by combustion of the secondary pyrotechnic material 16. In one application, the sidewall 20 may include four weakened zones uniformly distributed around the axis A.

In the embodiment illustrated, the primary pyrotechnic material 14 is distinct from the secondary pyrotechnic material 16. The primary pyrotechnic material 14 may be separated from the secondary pyrotechnic material 16 within the interior 18 of the cup 12 by a separator member. The primary pyrotechnic material 14 may be in the form of a slurry or in the form of a powder. The secondary pyrotechnic material 16 may be a granulated material, including but not limited to a boron based material. It will be understood the particular pyrotechnic materials 14 and 16 are outside of the scope of the present teachings and may be selected from various pyrotechnic materials well known in the art.

The initiator 10 of the present teachings may further include an adaptor or base member 30. The adaptor 30 functions to contain the first pyrotechnic material 14 and to provide an interface between the cup 12 and the separator member 28. The adaptor 30 may be formed of stainless steel or other suitable material. One suitable material is Type 304L stainless steel. The adaptor 30 is cylindrical in shape and includes a stepped configuration having a first or lower portion 32 and a second or upper portion 34. The first portion 32 has a first diameter and the second portion 34 has a smaller, second diameter.

The adaptor 30 is at least partially disposed in the cup 12. As shown, the adaptor 30 is completely or substantially completely disposed in the cup 12. The adaptor 30 is sized to be received within the open end 24 of the cup 12. The cylindrical sidewall 20 of the cup 12 may be attached to the adaptor 30 about a circumference of the adaptor 30. In the embodiment illustrated, the first portion 32 of the adaptor 30 may be welded to the cup 12.

The first portion 32 of the adaptor 30 defines a central opening 36 that receives an ignition device 38. The ignition device 38 conventionally includes a pair of electrical connectors or pins 40 and a bridge wire 42. The pair of electrical pins 40 are in reaction initiating communication with the first pyrotechnic material 14 through the bridge wire 42. In this regard, an electrical current delivered to the pins 40 will serve to melt the bridge wire 42 and ignite the first pyrotechnic material 14.

The second portion 34 of the adaptor 30 defines a central cavity or primary combustion chamber 44. As shown, the cavity or primary combustion chamber 44 is defined by a cylindrical sidewall of the second portion 34 of the adaptor 30. The primary combustion chamber 44 contains the primary pyrotechnic material 14. The primary combustion chamber 44 has an open end that is closed by the separator member 28. In the embodiment illustrated, separator member 28 may hermetically the primary pyrotechnic material 14 from the secondary pyrotechnic material 16 such that the primary and secondary pyrotechnic materials 14 and 16 shall mean that the primary and secondary materials 14 and 16 are completely sealed from one another.

Figure 3:
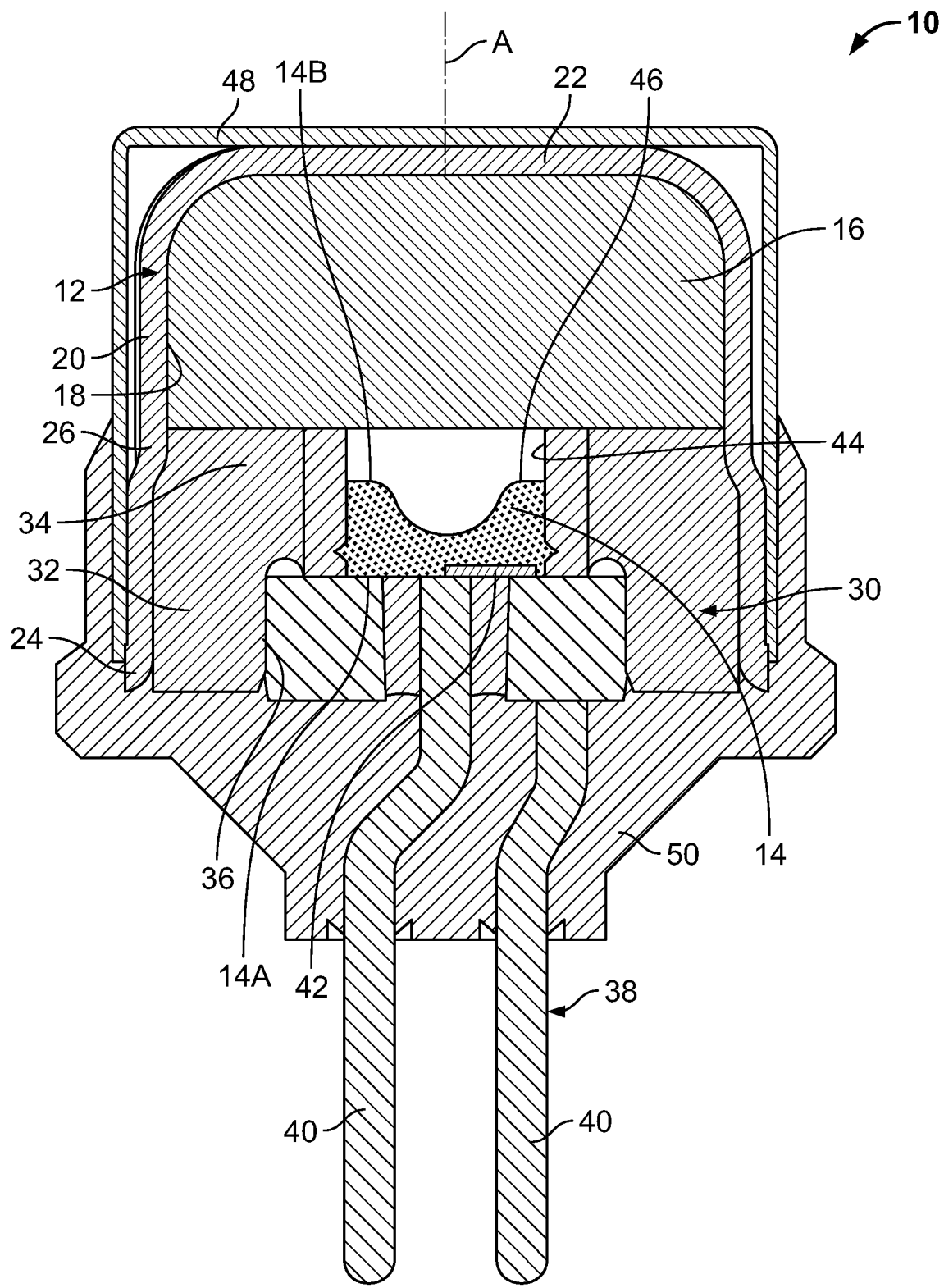
FIG. 3 is a cross-sectional view taken along the line 3-3 of FIG. 1.

The primary pyrotechnic material 14 is in reaction initiating contact with the bridge wire 42. As shown particularly in the cross-sectional view of FIG. 3, the primary pyrotechnic material 14 is in reaction initiating contact with the bridge wire 42 at a lower or first end of the primary combustion chamber 44. In this manner, a first end or first axial end 14A of the primary pyrotechnic material 14 is in reaction initiating contact with the bridge wire 42. As will be discussed further below, the primary pyrotechnic material 14 is compacted within the primary combustion chamber 44 to include a depression or recess 46 at a second end or second axial end 14B of the primary pyrotechnic material 14 that is opposite the first end 14A.

The initiator 10 of the present teachings is shown to further include an insulated resistance cover or static cover 48 and an elastomeric overmolding or overmolded member 50. These elements 48 and 50 will be understood to be conventional insofar as the present invention is concerned. Briefly, the overmolded member 50 may be an injection mold of a glass filled nylon 6 material. The static cover 48 may be constructed of nylon 6 or other plastic material.

Figure 4:
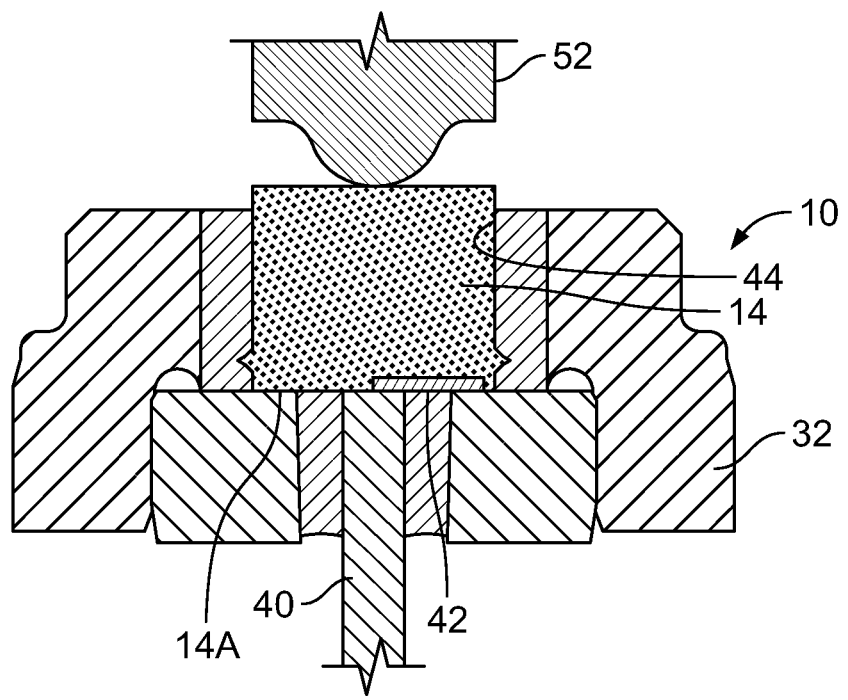
FIG. 4 is a simplified cross-sectional view of a portion of the initiator prior to compaction of a primary pyrotechnic material of the initiator by a ram.
Figure 5:
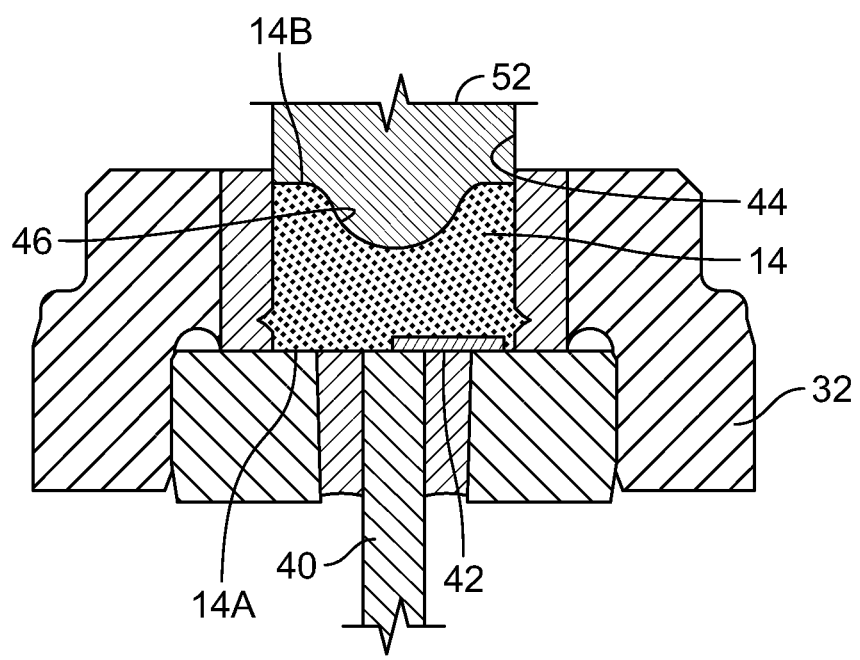
FIG. 5 is a simplified cross-sectional view similar to FIG. 4, illustrating the portion of the initiator after compaction of the primary pyrotechnic material of the initiator by the ram.

Turning to the simplified cross-sectional views of FIGS. 4 and 5, a portion of the initiator 10 is shown operatively associated with a ram 52 for compacting the primary pyrotechnic material 14 within the primary combustion chamber 44. In FIG. 4, the ram 52 is shown prior to compaction of the primary pyrotechnic material 14. In FIG. 5, the ram 52 is shown after compaction of the primary pyrotechnic material 14 within the primary combustion chamber 44.

The ram 52 has a male shape to define the dome shape depression 46. In other applications within the scope of the present teachings, the depression 46 may have a frustoconical shape or other shape. As illustrated, the second axial end 14B of the primary pyrotechnic material 14 includes a central depression or recess axially in line with at least a portion of the bridge wire 42. The depression 46 of the primary pyrotechnic material 14 is radially spaced from the sidewall defining the primary combustion chamber 44. In this regard, a toroidal shaped surface or portion is radially disposed between the depression 46 and the sidewall of the primary combustion chamber 44. This radial spacing of the depression 46 from the sidewall of the chamber 44 avoids stacking at the boundary defined by the sidewall that may otherwise prevent sufficient compaction of the primary pyrotechnic material 14 to attain optimal performance of the initiator 10. The first pyrotechnic material 14 may be axially compacted within the primary combustion chamber 44 to include a first density at a radially inner portion of the primary pyrotechnic material 14 and a second density at a radially outer portion of the primary pyrotechnic material 14, the first density being at least as great as the second density.

A diameter of the primary pyrotechnic material 14 and depth of the depression 46 at the second end 14B of the primary pyrotechnic material 14 may vary as a function of the axial length of the primary pyrotechnic material 14 at the cylindrical sidewall of the primary pyrotechnic chamber 44. As shown in FIG. 5, for example, the greatest diameter of the depression 46 may be greater than a radial dimension of the depression from the cylindrical sidewall of the primary pyrotechnic chamber 44.

In one particular embodiment, the primary combustion chamber may have a diameter of 3.6 mm and the primary pyrotechnic material 14 may have a weight of 43 mg. The primary pyrotechnic material 14 may be compacted to have an axial length of 1.32 mm. The dome shaped depression 46 may be semi-spherical and have a diameter of 0.609 mm. The toroidal shaped surface radially between the depression 46 and the sidewall of the chamber 44 may have a radial dimension of 0.508 mm.

In use, an electrical current is delivered to the pins 40 of the ignition device 38 to both test the initiator 10 and to activate the initiator 10. For purposes of testing the initiator 10, an electrical test signal is delivered to the pins 10 of the ignition device 38. The electrical test signal may have a first amperage. In one example, the first amperage may be approximately 0.4 amps. The present teachings provide a primary pyrotechnic material 14 that is sufficiently compacted proximate the bridge wire 42 such that heat generated at the bridge wire 42 may be wicked away by the primary pyrotechnic material 14 without actuating the primary pyrotechnic material 14.

When a collision event is sensed, an electrical fire signal is delivered to the pins 40 of the ignition device 38. The electrical fire signal may have a second amperage. The second amperage is greater than the first amperage of the electrical test signal. In one example, the second amperage may be approximately 1.75 amps. The current of the electrical fire signal melts the bridge wire 42 that in turn ignites the primary pyrotechnic material 14. Ignition of the primary pyrotechnic material 14 creates a pressure within the chamber 44 of the adaptor 30 which opens a weakened zone (not shown) of the separator member 28. Heat from the ignition of the primary pyrotechnic material 14 is vented through the opened weakened zone and ignites the secondary pyrotechnic material 16. Pressure from combustion of the secondary pyrotechnic material 16 opens the weakened zones 26 of the cup 12.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An initiator for a gas generator of a vehicle safety device, the initiator comprising:
   a cup defining an interior;
   a primary pyrotechnic material disposed in a primary combustion chamber in the interior of the cup; and
   a pair of electrical pins in reaction initiating communication with the primary pyrotechnic material through a bridge wire, the bridge wire in reaction initiating contact with the primary pyrotechnic material at a first end of the primary pyrotechnic material,
   wherein the primary pyrotechnic material is compacted within the primary combustion chamber to include a depression at a second end of the primary pyrotechnic material, the second end opposite the first end,
   wherein the depression at the second end of the primary pyrotechnic material is radially spaced from a sidewall of the primary combustion chamber, and
   wherein the second end of the primary pyrotechnic material includes a toroidal shaped portion radially disposed between the depression and the sidewall of the primary combustion chamber.

2. The initiator of claim 1, wherein the depression at the second end of the primary pyrotechnic material is axially in line with at least a portion of the bridge wire.

3. The initiator of claim 2, wherein the depression at the second end of the primary pyrotechnic material is centrally located in the primary combustion chamber.

4. The initiator of claim 1, wherein the depression at the second end of the primary pyrotechnic material is dome shaped.

5. The initiator of claim 1, wherein a greatest diameter of the depression is greater than a radial distance of the depression from a cylindrical sidewall defining the primary combustion chamber.

6. The initiator of claim 1, wherein the primary pyrotechnic material is sufficiently compressed in an area proximate to the bridge wire to absorb heat generated from an electrical test signal with a first amperage delivered to the electrical pins without combusting and to combust in response to an electrical test signal having a second amperage, the second amperage being greater than the first amperage.

7. An initiator for a gas generator of a vehicle safety device, the initiator comprising:
   a cup defining an interior;
   a primary combustion chamber within the interior of the cup;

a primary pyrotechnic material disposed in a primary combustion chamber; and a pair of electrical pins in reaction initiating communication with the primary pyrotechnic material through a bridge wire, the bridge wire in reaction initiating contact with the primary pyrotechnic material at a first axial end of the primary pyrotechnic material, wherein the primary pyrotechnic material is axially compacted within the primary combustion chamber to include a depression at a second axial end of the primary pyrotechnic material, the second axial end opposite the first axial end, wherein the depression at the second axial end of the primary pyrotechnic material is radially spaced from a sidewall of the primary combustion chamber, and wherein the second axial end of the primary pyrotechnic material includes a toroidal shaped portion radially disposed between the depression and the sidewall of the primary combustion chamber.

8. The initiator of claim 7, wherein the depression at the second axial end of the primary pyrotechnic material is axially in line with at least a portion of the bridge wire.

9. The initiator of claim 7, wherein the depression at the second axial end of the primary pyrotechnic material is dome shaped.

10. The initiator of claim 7, wherein the depression at the second axial end of the primary pyrotechnic material is centrally located in a radial direction within the primary combustion chamber.

11. The initiator of claim 7, wherein the primary pyrotechnic material is sufficiently compressed in an area proximate to the bridge wire to absorb heat generated from an electrical test signal with a first amperage delivered to the electrical pins without combusting and to combust in response to an electrical test signal having a second amperage, the second amperage being greater than the first amperage.

12. The initiator of claim 7, wherein the primary pyrotechnic material includes a first density at a radially inner portion of the primary pyrotechnic material and a second density at a radially outer portion of the primary pyrotechnic material, the first density being at least as great as the second density.

13. An initiator for a gas generator of a vehicle safety device, the initiator comprising:

a cup defining an interior;

a primary combustion chamber including a primary pyrotechnic material;

a secondary pyrotechnic material within the interior of the cup; and a pair of electrical pins in reaction initiating communication with the primary pyrotechnic material through a bridge wire, the bridge wire in reaction initiating contact with the primary pyrotechnic material at a first axial end of the primary pyrotechnic material, wherein the primary pyrotechnic material is compacted within the primary combustion chamber to include a depression at a second axial end of the primary pyrotechnic material, the second axial end opposite the first axial end, wherein combustion of the primary pyrotechnic material in turn actuates the secondary pyrotechnic material, and wherein the depression defines a concavity inwardly spaced from a sidewall of the primary combustion chamber.

14. The initiator of claim 13, wherein the primary pyrotechnic material is axially compacted within the primary combustion chamber to include a first density at a radially inner portion of the primary pyrotechnic material and a second density at a radially outer portion of the primary pyrotechnic material, the first density being greater than the second density.

15. The initiator of claim 13, wherein the depression at the second axial end of the primary pyrotechnic material is dome shaped.

16. The initiator of claim 13, wherein the primary pyrotechnic material has a first diameter and the secondary pyrotechnic material has a second diameter, the second diameter greater than the first diameter.

17. The initiator of claim 13, wherein:

the depression at the second axial end of the primary pyrotechnic material is radially spaced from a sidewall of the primary combustion chamber, and the second axial end of the primary pyrotechnic material includes a toroidal shaped surface radially disposed between the depression and the sidewall of the primary combustion chamber.

* * * * *